United States Patent [19]

Roberling

[11] 4,211,028

[45] Jul. 8, 1980

[54] RODENT POISON DISPENSER WITH PROTECTIVE CLOSURE PLATE OF ATTRACTIVE ODOR OR TASTE

[76] Inventor: Fritz Roberling, Buhnstrasse 82, Vlotho, Fed. Rep. of Germany

[21] Appl. No.: 948,627

[22] Filed: Oct. 3, 1978

[30] Foreign Application Priority Data

Oct. 8, 1977 [DE] Fed. Rep. of Germany ....... 2745407

[51] Int. Cl.² .......................................... A01M 25/00
[52] U.S. Cl. ...................................... 43/131; 119/54
[58] Field of Search ...................... 222/181, 182, 185; 366/192; 43/131, 124; 119/51 R, 52 R, 54

[56] References Cited

U.S. PATENT DOCUMENTS

| 1,108,566 | 8/1914 | Foster | 119/52 R |
| 1,188,274 | 6/1916 | Holligan | 119/54 |
| 1,222,556 | 4/1917 | McCormick | 119/54 |
| 3,083,687 | 4/1963 | Slaven | 119/51 R |
| 3,193,152 | 7/1965 | White, Jr. | 222/182 |
| 3,780,701 | 12/1973 | Wentworth, Sr. | 119/54 X |

FOREIGN PATENT DOCUMENTS

| 2024226 | 12/1971 | Fed. Rep. of Germany | 119/51 R |
| 2232991 | 1/1975 | France | 43/131 |

Primary Examiner—Robert J. Spar
Assistant Examiner—Fred A. Silverberg
Attorney, Agent, or Firm—Stevens, Davis, Miller & Mosher

[57] ABSTRACT

Rodent poison dispenser comprises a housing with an upper chamber suitable for holding poison bait separated by a separating wall from a lower chamber into which rodents can enter, wherein the separating wall has an opening which can be closed by a consumable protective plate of a taste or odor attractive to rodents.

10 Claims, 12 Drawing Figures

FIG. 9
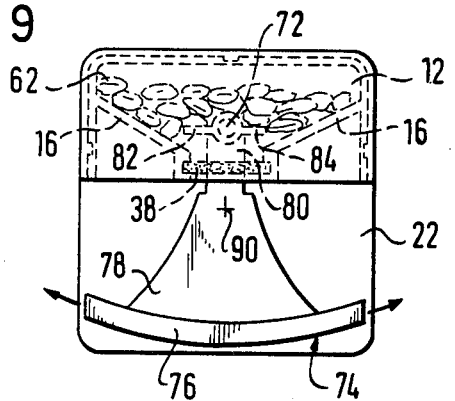
FIG. 11
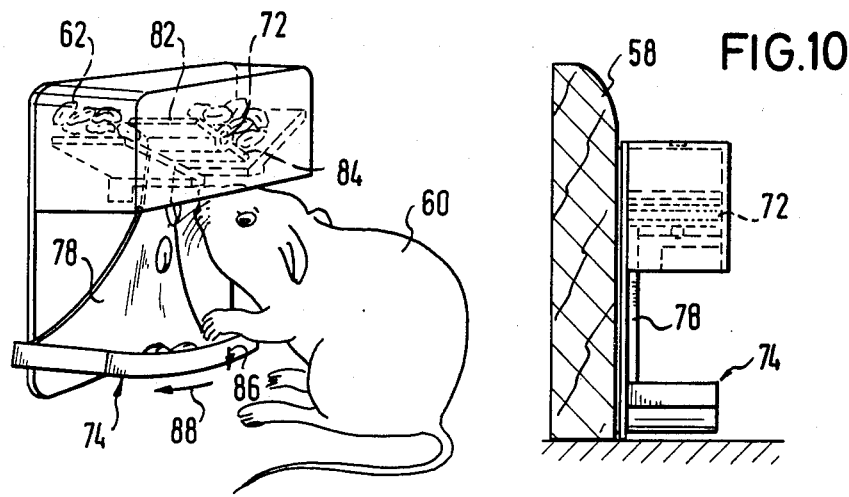
FIG. 10
FIG. 12
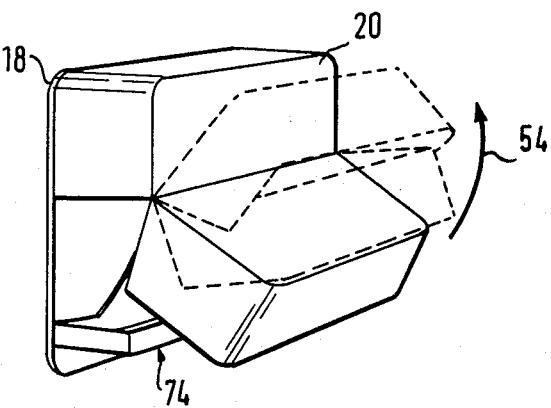

RODENT POISON DISPENSER WITH PROTECTIVE CLOSURE PLATE OF ATTRACTIVE ODOR OR TASTE

BACKGROUND OF THE INVENTION

This invention relates to a poison bait dispenser for household pests, and especially, to a dispenser of poison bait for rodents such as mice and rats.

Poisons, which can be poured, such as poisoned grain, are commonly placed in dishes on the floor or directly on the floor. This involves the danger that the poison is touched by hand or is distributed uncontrollably in the room. The poison is thus also available to children and domestic animals. There results not only danger of poisoning for humans and domestic animals, but also a hygienically and aesthetically undesirable condition.

SUMMARY OF THE INVENTION

The object of this invention is the creation of a poison bait dispenser which permits distribution of the poison at a definite location avoiding the danger that man or a domestic animal comes in contact with the poison during its distribution or at a later time.

This problem is solved according to this invention by a rodent poison dispenser containing a housing with two chambers. The chamber which is in the upper position when in use is adapted to hold a poison bait capable of gravity flow and is separated by a separating wall from a lower chamber which can be made accessible to rodents. The separating wall has an opening which is suitable to being closed by a protective plate made of a consumable substance of attractive taste or odor.

The poison bait, for example poisoned grain such as wheat or corn, can be introduced into the chamber by the manufacturer and is no longer accessible after closing of the upper chamber. Only when the rodent has gnawed through the small protective plate, individual granules of poisoned bait fall into the lower chamber which is accessible from the outside, but these granules are kept in the lower chamber so that a distribution into the entire room is prevented.

In this description statements such as forward, backwards, above or below refer to the position of the dispenser in use, for example, attached to a baseboard or other molding of a room.

In a preferred embodiment, the housing contains a case open on one side with a covering lid wherein that part of the lid which closes the upper chamber is firmly anchored to the case, while the portion of the lid covering the accessible chamber can be fractured in order to permit use. This breakable portion of the lid provides cover for the entire poison dispenser during storage and transportation so that additional protection is provided.

The separating wall can decline towards the opening. For example, it can decline bilaterally to an opening in the middle of the separating wall. Below the border of the opening there may be guiding rails which run along the sides of at least part of the opening and which serve to insert the small protective plate. The protective plate is kept in place after insertion of a lid.

The lower chamber may be open to the front or to the side; it is preferred to have at the lower side a poison bowl with a surrounding border which catches the poison running down and is accessible to the rodent.

The separating wall is preferably attached to the bottom of the case and arises therefrom to the height of the lateral walls of the case; the upper chamber is closed by the lid from the front. In a preferred embodiment of the invention the inside walls of the lid closing the upper chamber have attaching means, which coact with corresponding attaching means on the outside of the walls of the case so that the upper chamber can no longer be opened after closure. The attaching means can be round pins and corresponding cavities; they can also be in wedge or key shape with edges which are flat in the direction of closure and of sharp angle in backward direction so that a subsequent opening is practically prevented.

The portion of the lid which covers the accessible chamber is preferably connected to the other part of the lid by a weakened section with a break-off line or by section with a slit or groove so that portion can be removed readily, while during transportation and storage the chamber is still closed.

In a preferred embodiment of the invention, the back of the housing contains an adhesive foil which is covered during transportation by a protective foil; thus the housing can be attached after withdrawal of the protective foil to a base board or the wall.

While the illustrative drawings show use of the invention with a mouse and with wheat, the invention is also applicable to other rodents such as rats and other poisoned bait may be used, typically corn and other cereal grains.

The invention is not limited in spirit or in scope by the details described in these illustrative examples, but includes all variations in execution of the poison dispenser described.

BRIEF DESCRIPTION OF THE DRAWINGS

FIG. 9 shows a schematic front view of an additional embodiment of the invention.

FIG. 10 shows the corresponding side view.

FIG. 11 shows the embodiment according to FIGS. 9 and 10 after use.

FIG. 12 shows the removal of the lower part of the lid before placing the dispenser in use.

DESCRIPTION OF THE PREFERRED EMBODIMENT

Figure 1:
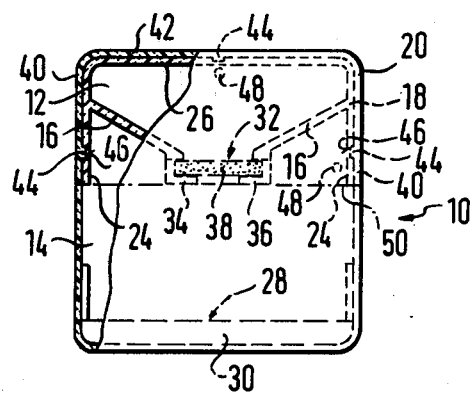
FIG. 1 is a schematic front view of an embodiment of the poison dispenser.

In the following there will be first explained the embodiment according to FIGS. 1-5. The illustrated dispenser can be made of plastic and preferably of transparent plastic which permits control of the poison content at all times. The housing 10 is subdivided into an upper chamber 12 and a lower chamber 14 between which there is a separating wall 16. The housing 10 consists of a flat case, which is open to the viewer in FIG. 1, and a covering lid 20. From the base 22 (FIG.

2) forming the back wall of the housing, there extend the lateral walls 24 and an upper wall 26 in the upper chamber. The lateral walls 24 are connected by the separating wall 16. Walls 24 and 26 and separating wall 16 end towards the front on the same plane.

The lower wall of chamber 14 is shaped to form receptacle 28 with a border 30. Within the range of the lateral walls, the border 30 runs diagonally into the base 22 so that a firm support for the poison receptacle 28 is assured.

In FIG. 1, the separating wall 16 is inclined diagonally downward from both sides so that both sides meet in the area of opening 32. At the bottom of opening 32, at least in the region adjacent to bottom 22, there are shown guiding rails 34 and 36 which support and guide the small protective plate 38. The protective plate 38 can consist, for example, of cheese that can be stored for prolonged periods of time or of a firmer carrier substance into which are incorporated aromatic substances attractive to rodents. In any case, the protective plate is so constituted that it attracts rodents and can be perforated by them by gnawing. After insertion of lid 20 the protective plate 38 can no longer slide away so that it provides a durable closure for chamber 12.

Lid 20, in the upper region, shows lateral walls 40 and upper wall 42 which lie against the corresponding walls 24 and 26. On the inside of walls 40 and 42 of the lid there are attached pegs 44 which fit into the corresponding cavities 46 of walls 22 and 26 and cause upper chamber 12 to be firmly closed so that it cannot be opened without obstruction.

On the side of the cover 20 of the upper chamber 12 which is turned away from the viewer, there can be provided pegs 48 which meet walls 24 and 26 of the box. Finally, in a manner not illustrated, the lateral walls 40 of the lid can grab as a flange below the lateral walls of the box in the region of broken line 50 in FIG. 1, so that the upper chamber is very firmly held together in its entirety.

Figure 2:
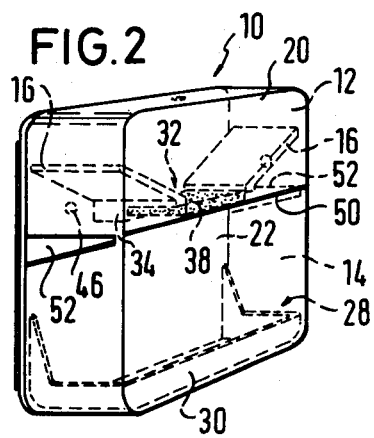
FIG. 2 is a corresponding perspective view.

At the above mentioned broken line 50 the upper part of lid 20 is joined to the lower part at a weakened break-off line, which permits a breaking off of the lower portion. In FIG. 2 there is in the region of the lateral walls a slit 52 of corresponding height so that the lower portion of cover 20 can be bent in the direction of the arrow in FIG. 3 and finally broken off. The slits 52 do not have to have the wedge form of FIG. 2; however, they should not be of sufficient width so as to permit escape of the poison, in case the closure provided by protective plate 38 should fail, in an exceptional case, to provide a completely tight closure.

In a manner not illustrated, a bilateral adhesive strip may be attached over slit 52 in FIG. 2 which simultaneously serves to keep in place the lower part of lid 20 in storage and transportation and which permits on its adhesive outer wall the acceptance and attachment of descriptive or other papers. The lower chamber 14, before use, can be used to store instructions, the essential portions of which can be arranged in such a manner that they are visible to the outside through the front portion of the lid prior to opening of the lower part of the lid.

Figures 3, 4:
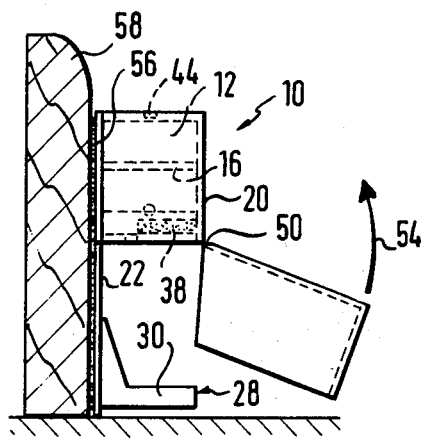
FIG. 3 shows a schematic side view in use.
FIG. 4 shows a corresponding side view after removal of the lower part of the lid.

According to FIG. 3, there is provided at the back of housing 10 a bilaterally adhesive foil 56 which, after removal of a protective foil (not shown), permits attachment of the housing 10 to a molding 28. After removal of the lower part of the lid there is thus created the position of FIG. 4.

Figure 5:
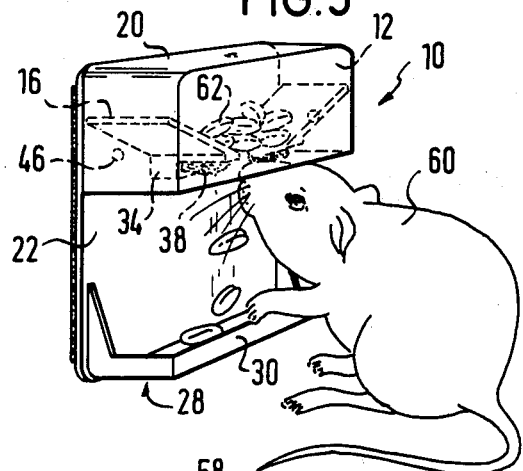
FIG. 5 is a perspective view of the poison dispenser with a mouse.

FIG. 5 shows a mouse 60 gnawing through the small protective plate 38, causing the poisoned wheat 62 to fall from chamber 14 into poison receptacle 28. The opening 32 should be only of such a size that the poisoned bait pours down in individual grains or, in any case, only in minor amounts and may have to be pulled out gradually by the paw of the rodent. The inclination of the wall 16 would also be be made only sufficiently great that the poisoned grain does not run in a stream after the rodent has gnawed through the protective plate.

The protective plate 38, which is attractive to the rodent pest is in a position in which it is observed at once by a rodent running by, while it cannot be reached by larger domestic animals or children.

Figure 6:
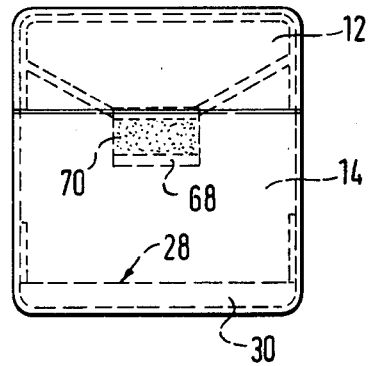
FIG. 6 is a schematic front view of an additional embodiment of the invention.
Figure 7:
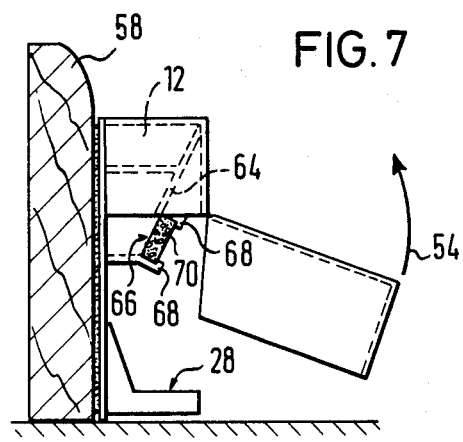
FIG. 7 is a schematic side view of the poison dispenser in use.
Figure 8:
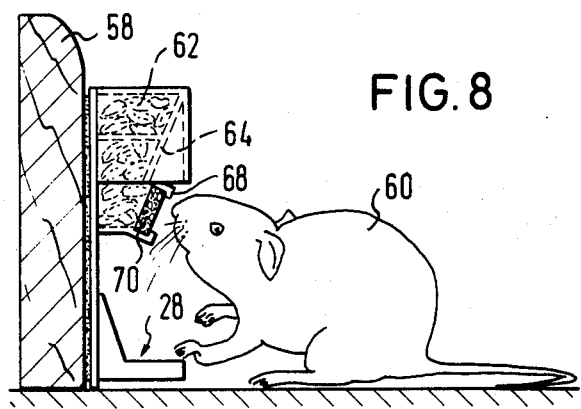
FIG. 8 shows a side view of the poison dispenser with a mouse.

FIGS. 6 to 8 show a further embodiment of the invention in which the protective plate is not horizontal, but inclines diagonally towards the front. In contrast to the preceding example, the upper chamber 12 shows an additional separating wall 64 running downward and to the rear, which provides a forward border to upper chamber 12. At the lower end of separating wall 64, there is found in its plane an opening 66; its exterior side slanting to the front is equipped with guiding rails 68. These guiding rails again accept a protective plate 70; otherwise the arrangement corresponds to the preceding example.

Instead of the use of the mentioned attaching means, the box and the lid can be firmly glued together in the region of the upper chamber. The protective plate can also be affixed by gluing in the area of the opening. In place of the adhesive foil at the back of the housing there can be placed in appropriate position a hook to permit the dispenser to be hung on a nail.

The dispenser of the invention can be appropriately placed in various concealed places in a room such as behind furniture, machines, and the like, and may be attached to base boards. It may remain in place for prolonged periods of time. It can be used prophylactically without constant supervision since there is durable protection of the poison against inadvertent access by children and domestic animals and since the poison dispenser is neither optically disturbing nor interferes with cleaning operation. The flow of the poison from the opening which has been gnawed free appears to have a stimulating effect on the rodent and corresponds to its experiences on gnawing through bags of food or sacks of feed stuff. The poison which remains in the upper chamber after a visit by a rodent to the dispenser remains dry and dust free and is still effective after a long time.

In the embodiment according to FIGS. 9 to 12 there is provided, in lieu of a poison bowl 28 firmly attached to the bottom 22, a poison bowl 74 which pivots around axle 72; the bowl shows a surrounding and upward projecting border 76 which catches poison bait running down. The poison bowl 74 can have the form of an arc, as in FIG. 9, or the straight form of poison bowl 28. Poison bowl 74 rises from a carrier plate 78 which runs together upward in wedge form in straight on bent lines in such a manner that it can enter through opening 32. From this narrower upper end 80 of carrier plate 78, there extend two horizontal wings 82 to 84 (shown in medium position in FIG. 9), which have the depth of the upper bait storage chamber 12; there is a space between the end of these wings and the separating wall 16; this space is insufficient to allow passage of granules when the bowl is in horizontal position, but permits passage when the bowl moves to one side.

In FIG. 11, if the mouse 60 puts pressure on the poison bowl 74 in the direction of arrow 86, the poison bowl 74 swings around axle 72; in FIG. 11 and FIG. 9 it has swung to the left. This oscillation produces an increase in the opening between wing 82 and separating walls 16 on the left side, causing several poisoned bait granules to pour down. When the poison bowl 74 returns to the center position, the poisoned bait 62 is maintained essentially in chamber 12. In this embodiment, the protective plate, which is not shown, is shortened somewhat, so that the necessary space for carrier plate 78 is provided.

When the lower part of lid 20 covers the case 18, it prevents pendular motion of the poison bowl 74. On bending up the lower part of the lid in the direction of arrow 54 in FIG. 12, and subsequent breaking off of this portion of the lid, the poison bowl 74 is freed.

The position of axle 72 can be chosen in ways alternate to that of the illustration of FIG. 9. For example, it has been found advantageous in practice to use position 90 according to FIG. 9, which is located essentially at the center of the base 22. The position 72 can be chosen according to the desired transmission ratio between the motion of poison bowl 74 and wings 82 and 84.

A combination of embodiments according to FIG. 1 to 5 on the one hand, and FIGS. 9 to 12 on the other hand, is possible by equipping poison bowl 28 of FIGS. 1-5 with a lever or the like, accessible to the rodent, which actuates a wing arrangement 82, 84.

What is claimed is:

1. Rodent poison dispenser comprising a housing with an upper chamber suitable for holding poison bait, which is separated by a separating wall from a lower chamber into which rodents can enter, wherein the separating wall has an opening which is capable of being closed by a consumable protective plate of an odor or taste attractive to rodents, the poison bait is is supported by the consumable protective plate and when the rodent eats through the protective plate the poison falls through the opening, wherein the separating wall is inclined downwardly to the opening and wherein there are provided at sides of the opening guiding means for insertion of the protective plate.

2. The rodent poison dispenser of claim 1 wherein a lid covering the upper chamber is firmly mounted and wherein a lid covering the lower chamber can be readily removed prior to use.

3. The rodent poison dispenser according to claim 2 wherein a part of the lid covering the upper chamber is provided with anchoring means, which interact with corresponding anchoring means at an upper wall of said upper chamber.

4. The rodent poison dispenser of claim 2 wherein the lid which covers the lower chamber is connected with the lid which covers the upper chamber by a portion containing a weakened breaking line.

5. The rodent poison dispenser of claim 1 wherein a bottom of the lower chamber provides a poison retaining bowl with a surrounding wall.

6. The rodent poison dispenser of claim 5 wherein the poison collecting bowl in the lower chamber is suspended by a carrier plate and wherein the carrier plate is equipped with two wings projecting into the region of the upper chamber capable of regulating flow of bait when the carrier plate swings to one side.

7. The rodent poison dispenser according to claim 6 wherein an axle supporting undulating motion of the poison bowl is situated within the upper chamber.

8. The rodent poison dispenser according to claim 6 wherein an axle supporting undulating motion of the poison bowl is situated near the center of the housing.

9. The rodent poison dispenser according to claim 6 wherein the wings extend in horizontal direction when the poison bowl is in middle position and wherein the wings terminate at a distance from the separating wall which is smaller than the size of the granules of the poison bait.

10. The rodent poison dispenser of claim 1, wherein the guiding means for insertion of the protective plate are rails.

* * * * *